UNITED STATES PATENT OFFICE.

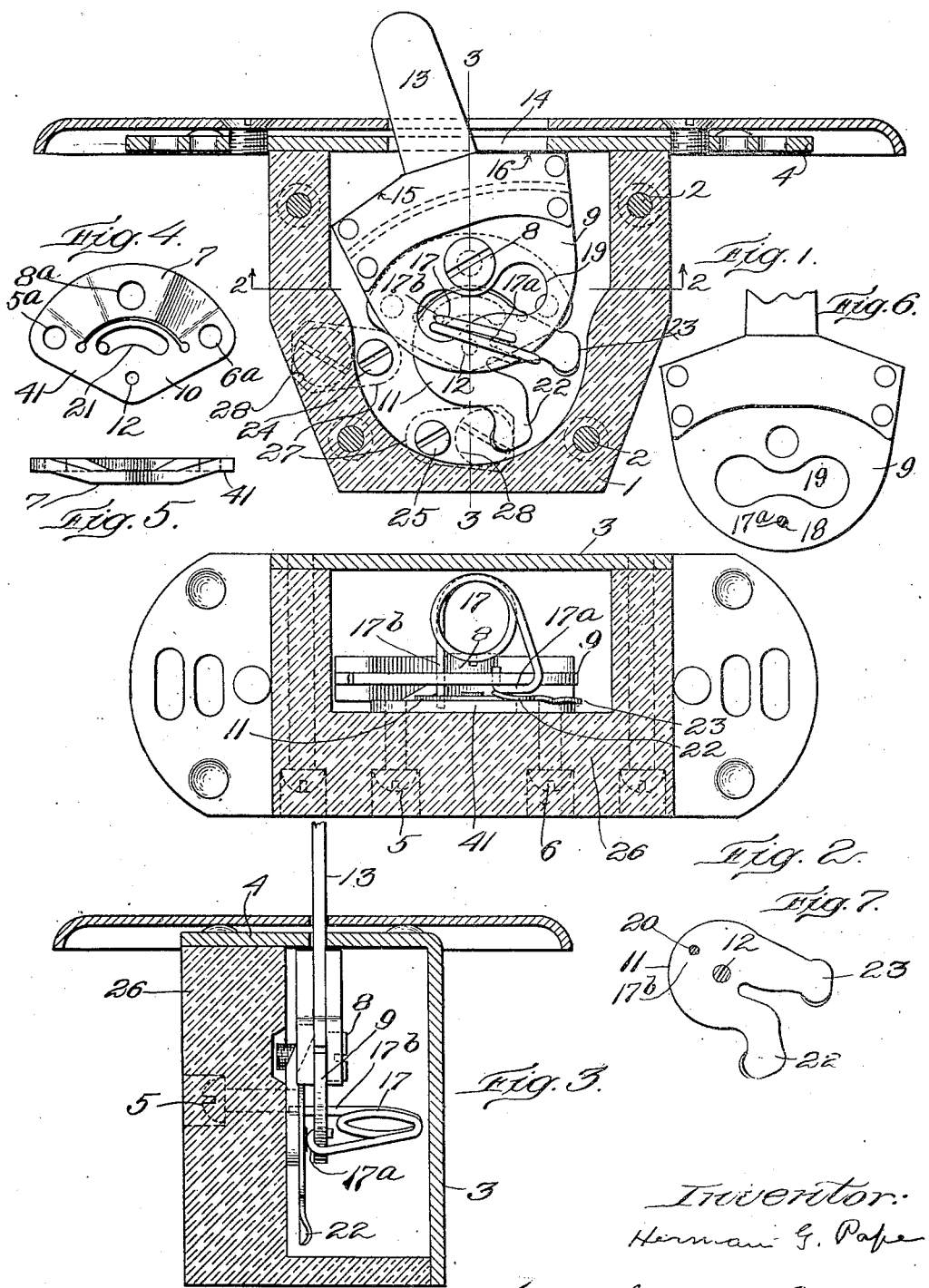

HERMAN G. PAPE, OF NEW YORK, N. Y., ASSIGNOR TO RALPH A. SCHOENBERG, OF NEW YORK, N. Y.

MECHANICAL MOVEMENT.

1,246,646.  Specification of Letters Patent.  Patented Nov. 13, 1917.

Application filed July 5, 1917. Serial No. 178,578.

*To all whom it may concern:*

Be it known that I, HERMAN G. PAPE, of New York city, in the county and State of New York, have invented a new and useful Mechanical Movement, of which the following is a specification.

One feature of my invention consists in using an oscillating driving member to operate a driven member by means of a spring which oscillates on an axis perpendicular to the direction of movement of one of said members.

Another feature consists in providing an oscillating driven member in the above combination.

Another feature consists in offsetting the pivots of the two oscillating members.

Another feature is a finger piece for operating the mechanical movement.

Another feature is the pivotal mounting of the spring.

Another feature is the use of a base plate to limit the movements of the driven member.

Other features will be pointed out below.

In the drawings:

Figure 1 is a central longitudinal sectional view of a mechanical movement embodying my invention;

Fig. 2 is a section on line 2—2 of Fig. 1;

Fig. 3 is a section on line 3—3 of Fig. 1;

Fig. 4 is a plan view and Fig. 5 an edge view of the base plate hereinafter described.

Fig. 6 is a plan view of the actuating member; and

Fig. 7 is a plan of the driven member.

As an example of one application of my new mechanical movement and as an aid to an understanding of its construction and mode of operation, I have herein shown the same as embodied in a switch for controlling an electric circuit. This switch comprises a hollow body 1 of insulating material fastened by screws 2, 2, to a side plate 3 integral with and projecting perpendicularly from an attachment plate 4 by means of which the switch is fastened in place upon the usual junction box (not shown). Within the body 1 is secured the switch mechanism which embodies my new mechanical movement.

This mechanism includes a base plate 41 fastened by two screws 5 and 6 to body 1 and formed with an elevated seat 7 having a threaded aperture $8^a$ to receive the end of a stud screw 8 by means of which an actuating or driving member 9 is pivotally secured thereon. Upon the lower portion 10 of base plate 41 is seated the driven member 11 pivotally connected with said plate by a stud 12 projecting from the latter. This stud 12 has one end riveted to base plate 41 and the actuated or driven member 11 is held in position thereon by reason of its position between the base plate 41 and actuating member 9.

The member 9 is made with a finger piece 13 extending through a slot 14 in attaching plate 4, said finger piece being provided to be manually manipulated to oscillate member 9 on stud screw 8. Shoulders 15 and 16 on member 9 engage the inner side of attaching plate 4 to limit the extent of movement of said member in both directions. A bow spring 17 connects the two members 9 and 11 and serves as a means through which the oscillating movements of member 9 act to oscillate the driven member 11. One end $17^a$ of this bow spring 17 is bent laterally between the members 9 and 11 and has its extremity again bent perpendicularly and swiveled in a round hole 18 provided in actuating member 9. The other end $17^b$ of bow spring 17 is straight and extends through a clearance hole 19, in member 9 into and through a round hole 20 formed through driven member 11 parallel with the hole 18 of member 9 and within which it is swiveled. This straight end of spring 17 projects beyond hole 20 into an arcuate slot 21, see Fig. 4, whose ends serve as stops or abutments which limit the movements of member 11 in both directions.

When the finger piece 13 is swung in either direction the hole 18 within which the end $17^a$ of spring 17 is swiveled is moved around the axis of stud screw 8 toward the hole 20 within which the opposite end $17^b$ of spring 17 is swiveled, thereby increasing the stress of said spring and also changing the direction of the application of its force to member 11. When the direction of the application of the force of spring 17 to member 11 has been changed to such an angle with relation to stud 12 that said force starts to swing member 11 on stud 12, then said member is snapped in one quick movement to the opposite extreme of its movement. Thus there is no creeping movement of member 11 at the start of its movement but said movement is a quick and snappy one throughout. The reason for this is due mainly to the fact that the movement of member 11 itself supplements the movement of member 9 in the effect of the latter upon the direction of the application of the force of spring 17 upon member 11. Of course when the parts are at rest the spring 17 which is normally under stress, holds both the actuating and actuated members each at the limit of its movement in either direction.

The actuated member 11 is herein shown as made with two resilient arms 22 and 23 to coöperate with two stationary contacts 24 and 25, the contact 24 and arm 22 being offset laterally with relation to the contact 25 and arm 23, so that arm 24 passes over contact 25 without striking it and engages only contact 24. These two contacts 24 and 25 are herein shown as the heads of screws extending through the rear wall 26 of body 1 and each screwed into a binding post base-plate 27 carrying a binding screw 28. The binding screws serve to connect the lead wires (not shown) with the base plates 27.

What I claim is:

1. A mechanical movement comprising an oscillating driving member; an oscillating driven member; and a spring actuated by said driving member and actuating said driven member which spring oscillates on an axis perpendicular to the direction of movement of one of said members.

2. A mechanical movement comprising an oscillating driving member and an oscillating driven member, the pivots of said members being offset; and a spring actuated by said driving member and actuating said driven member which spring oscillates on an axis perpendicular to the direction of movement of one of said members.

3. A mechanical movement comprising an oscillating driving member and an oscillating driven member, the pivots of said members being offset and parallel; and a spring actuated by said driving member and actuating said driven member which spring oscillates on an axis perpendicular to the direction of movement of one of said members.

4. A mechanical movement comprising an oscillating driving member in the form of a lever, one arm of which serves as a finger piece; a driven member; and a spring actuated by said driving member and actuating said driven member which spring oscillates on an axis perpendicular to the direction of movement of one of said members.

5. A mechanical movement comprising an oscillating driving member; a driven member; and a spring actuated by said driving member and actuating said driven member which spring oscillates on an axis perpendicular to the direction of movement of one of said members, one end of said spring extending through the driving member into pivotal engagement with the driven member and the other end of the spring being pivotally connected with the driving member.

6. A mechanical movement comprising a driving member; an oscillating driven member; a spring actuated by said driving member and actuating said driven member which spring oscillates on an axis perpendicular to the direction of movement of one of said members; and a base plate on which said two members are mounted, said plate being provided with two stop shoulders engaged by the spring to limit the movements of the driven member.

HERMAN G. PAPE.